United States Patent Office 3,447,972
Patented June 3, 1969

3,447,972
PROCESS AND COMPOSITIONS FOR PRODUCING ALUMINUM SURFACE CONVERSION COATINGS
Arthur G. Wilde, Jr., Waukegan, Eugene F. Maisel, Palatine, and Floyd L. Mickelson, Chicago, Ill., assignors to The Diversey Corporation, Chicago, Ill., a corporation of Illinois
No Drawing. Filed May 9, 1966, Ser. No. 548,431
Int. Cl. C23f 7/26; C23c 3/00, 7/00
U.S. Cl. 148—6.2                                3 Claims

ABSTRACT OF THE DISCLOSURE

Disclosed is a process and compositions for producing aluminum surface conversion coatings. The process uses aqueous acidic treating baths containing free halogen ions, hexavalent chromium-containing anions, nickel cations and nitrate anions, with advisably a ratio of 2.5 to 4.5 parts nickel to 1 part nitrate.

---

This invention relates to the art of chemically coating aluminum surfaces, for production of corrosion resistant and paint bonding coating upon such surfaces. The invention is especially concerned with novel compositions and methods of producing improved surface coatings on surfaces of aluminum objects. The term "aluminum" as employed herein is intended to denote pure aluminum, commercial grade aluminum containing small amounts of other materials, and aluminum alloys, i.e., those in which aluminum predominates or in which aluminum is the major component.

When an object having a surface of aluminum is cleaned free of grease and other surface soil, and is then immersed in or otherwise contacted with a solution containing anions of an acid which attacks aluminum, such as hydrofluoric acid, together with dichromate and hydrogen ions, a chemical reaction occurs which results in a fixed, integral film upon the aluminum surface. The precise nature of this reaction, and of the resulting film is not known. Probably some of the aluminum is dissolved, bringing about an increase of pH at the interface between the aluminum surface and bath liquid, and formation of chromium and aluminum halides, oxides or hydroxides. Generally, these coating are thin, smooth, non-crystalline, relatively adherent and flexible, moderately lustrous, and are of yellow or golden color, with more or less red, blue and greenish iridescence. The exact shade of color and degree of lustre differ greatly, according to which alloy is being processed and according to the details of the processing procedure. Such coatings are known as conversion coatings.

Chemical conversion coatings of the kind described have been found sufficiently advantageous to warrant increasing use by airplane manufactures and other industrial fabricators of aluminum, as well as for building purposes. The application of such coatings has certain attractive features, including simplicity, low processing temperatures, brief contact time and feasibility of spray application. However, the coatings of the prior art are not fully satisfactory. They give insufficient corrosion resistance to meet present day exacting requirements, such as for military aircraft intended to be flown over salt-laden ocean atmospheres. Another unsatisfactory feature is lack of adherence of the coating immediately after work pieces are lifted from processing tanks. Fresh coatings are subject to streaking and smearing when the coated object is handled shortly after processing. This is inconvenient under heavy shop production schedules, and is a prevalent cause of defective work, rejects, and low production rate. Another drawback of the prior art has been that when the processing has been so adjusted as to temperatures, concentrations, and contact time as to produce deep solid coloring, desirable for ornamentation, the coatings have been lacking in the requisite degree of corrosion resistance.

United States Patent No. 3,066,055 pertains to conversion coatings for aluminum. The coatings produced according to this patent can be colorless or colored, i.e., yellow or golden colored. The colored coatings are generally more corrosion resistant and are accordingly the type of coatings with which we are most concerned. The conversion coating compositions of United States Patent No. 3,066,055 include those containing hexavalent chromium-containing anions, a compound which provides free halogen ions, a compound which provides certain metal cations, including nickel ions. The resulting conversion coatings, however, do not give corrosion protection to the desired extent.

It has been found according to the present invention that excellent colored conversion coatings can be applied by subjecting the surface of an aluminum object to an acidic aqueous bath at a pH of 1.3 to 1.7 and containing a halogen-containing anion forming at least some free halogen ions, hexavalent chromium-containing anions, nickel cations and nitrate anions with the ratio by weight of nickel to nitrate being from about 2 to 10, and advisably 2.5 to 4.5 parts nickel to 1 part nitrate. The resulting conversion coatings are characterized by improved corrosion resistance, being quickly formed and fixed, resistance to smearing and by improved brilliance and uniformity of color. The coatings are more uniform from object to object, and from one alloy to another, than previously used conversion coatings.

In the practice of the invention an aqueous solution is first prepared containing in suitable proportions the cation derived from nickel, the anion derived from nitrate, and the hexavalent chromium-containing anion, together with hydrogen ions and a suitable proportion of halogen-containing anion, e.g., fluorine-containing anion. The processing solution thus prepared is contacted with the clean aluminum surfaces by the usual methods of application, such as spraying, immersion, brushing, swabbing, etc., under suitable conditions of temperature and length of time of contact to produce the desired improved surface conversion coating.

The anion containing hexavalent chromium appears to function in conjunction with the cation derived from nickel, as well as with the other ions in the solution, to confer greater corrosion resistance to the resulting coating, and also to cause the yellow color of the coating. When anions containing hexavalent chromium are present in the solution, the source material for said chromium may be a material such as chromium trioxide or a chromate or dichromate such as sodium or potassium chromate or dichromate.

The coating solutions also contain an anion which effectively attacks or corrodes aluminum such as a halogen-containing anion, i.e., an anion containing fluorine, chlorine, bromine, or iodine. The simple halogen anions can be employed or complex anions containing a halogen. The complex halogen-containing anions which are suitable are those forming free halogen ions in equilibrium with the complex anion under the acid conditions employed. The preferred anion is the fluorine-containing ion either as a simple fluorine anion or in the form of a complex, as this type is the most effective and convenient. The anions of chlorine, bromine and iodine are also effective and useful for the attack on the aluminum surface, but in a lesser degree and by the use of higher processing temperatures and longer periods of contact. The latter anions are usually employed as the simple chlorine, bromine or iodine anions.

The cations of nickel may be introduced by means of commonly available commercial products, such as the carbonates, oxides, hydroxides, halides and nitrates of nickel.

The nitrate anion of the invention may be introduced by means of commonly available commercial products, such as sodium nitrate, potassium nitrate, ammonium nitrate, nitric acid, or any alkali metal compound from which the nitrate anion may be obtained.

We have found that for providing satisfactory processing solutions the use of nickel carbonate, and preferably nickel nitrate, can be employed. When nickel nitrate is employed, an additional source of nickel, such as nickel carbonate, is used to obtain the desired $Ni:NO_3$ ratio.

The amount in grams per liter of cation derived from nickel, the amount of hexavalent chromium and the amount of the halogen, preferably fluorine, in the aluminum attacking halogen-containing anion advisably is controlled to be within certain ranges or proportions.

Generally, the amount of nickel cation employed is about 0.2 to about 8.0 grams of the element per liter of processing solution, and the amount of nitrate anion employed is about 0.1 to about 3.0 grams per liter of processing solution.

Considerable latitude in the concentration of hexavalent chromium-containing compound is acceptable. A suitable working concentration of hexavalent chromium anion for the purpose of the invention is produced by employing between about 0.3 and about 9.0 grams of the element chromium ion per liter of processing solution.

In view of a lack of exact knowledge of the chemical reactions that occur in the coating process, the amount of compound containing the aluminum attacking anion, generally halogen and preferably fluorine-containing compound, to be introduced into the coating solution cannot b precisely fixed because of the wide variations in conditions encountered. However, highly satisfactory results are obtained with solutions in which the weight ratio of hexavalent chromium anion: fluorine present in the fluorine-containing anion has a range between about 0.7:1 to 2.5:1.

Many fluorine compounds can be successfully used as the source of said ions, including HF, NaF, $NH_4HF_2$, $HBF_4$, $NaBF_4$, $NH_4BF_4$, $ZnSiF_6$ and $Na_2SiF_6$. Such compounds vary in ionization characteristics and hence, they are used in varying proportions, depending upon the particular compound selected. The complex ions, e.g., the $BF_4$ and $SiF_6$ ions produced by the corresponding compounds are believed to dissociate to form free fluorine anions and hence, such free fluorine anions are present and in equilibrium with the complex anions. The simple fluorides, such as NaF, should be present such that the ratio of hexavalent chromium anions: fluorine approaches the 2.5 end of the above range. The more complex fluorine compounds, such as $NaBF_4$, may be satisfactorily used in larger quantities, so that the aforementioned ratio approaches the 0.7 limit of the above range.

When it is desired to employ aluminum-attacking substances other than those containing fluorine, the same general considerations obtain as to the proportions between such substances and the hexavalent chromium-containing or equivalent anions. Thus, for example, when chlorine-containing substances are used, the range of the weight ratio Cr(VI):Cl may be about the same as for fluorine, i.e., about 0.7:1 to about 2.5:1. Because of the higher atomic weights of bromine and iodine, and the more sluggish action in processing baths of this invention, as compared with fluorine, it is feasible to use larger amounts of Br and I, so that, for example, the value of the weight ratio Cr(VI):Br or I will be smaller. Thus, a suitable range for Cr(VI):Br is about 0.5:1 to about 1.7:1, and a suitable range of Cr(VI):I is about 0.3:1 to about 1.4:1.

Processing solutions for practice of the invention should most desirably possess a concentration of hydrogen ions such that the pH of the solution falls within the overall range of about 1.3 to about 1.7, and advisably 1.5 to 1.6.

The chemicals for makeup of the bath may be introduced in any convenient form such as powders or liquid solutions, separately, or as compounded products. Usually it is most convenient to employ the dry materials as a compounded powder or granular product. The novel compositions in the form of mixtures in dry form, as well as the solutions prepared therewith, are features of this invention.

The dry mixtures of the invention include a compound containing a cation derived from nickel, a compound containing the nitrate anion, a compound containing hexavalent chromium for production of a chromium-containing anion, and a compound containing a material producing an aluminum attacking anion, advisably a halogen and preferably the fluorine-containing anion. The mixtures are prepared to contain about 2 to 10, and advisably 2.5 to 4.5, parts by weight of nickel ions to 1 part by weight of nitrate ions.

Dry free-flowing mixtures advisably should contain about 3.0% to about 35.0% calculated as the element nickel by weight of the composition, 0.6% to about 17.5% by weight of nitrate, and a weight of compound equivalent to about 5.0% to about 50.0% by weight calculated as hexavalent chromium in anion-producing substances. The halogen-containing, e.g., fluorine-containing, compound advisably is present in an amount such that the composition contains about 2.0% to about 40.0% by weight calculated as the simple halogen, such as fluorine.

When the nickel, nitrate, hexavalent chromium or equivalent material, and the halogen-producing material are present in the dry mixture in the aforementioned range of proportions, the addition of such dry mixture to water in an amount of about 1.0 to 3.0 ounces per gallon forms a solution of the nickel cation, the nitrate anion, the hexavalent chromium-containing or equivalent anion and the halogen material generally within the range of amounts previously given as the desired concentrations of these materials.

The following dry mixture formula gives improved salt spray test corrosion resistance on aluminum:

| Ingredients: | Percent by wt. |
|---|---|
| Sodium silicofluoride, $Na_2SiF_6$ | 48.0 |
| Chromium trioxide, $CrO_3$ | 35.6 |
| Nickel carbonate, $NiCO_3$ | 11.2 |
| Nickel nitrate, $Ni(NO_3)_2 \cdot 6H_2O$ | 5.2 |

The above formula has a ratio of 3 $Ni^{++}$ to 1 $(NO_3)^-$.

A stainless steel vessel can be used for the bath, or some equally resistant vessel that will neither be attacked by the bath, nor have any contaminating effect on the bath.

The aluminum surfaces to be treated in the solutions of the invention should be free from grease and other surface soils. A mild alkaline cleaning bath safe for aluminum is recommended for this purpose.

End results frequently will be improved if surface oxide coating is removed, after alkaline cleaning, by pretreatment in a suitable acid type deoxidizing agent, e.g., mixtures of sulfuric, chromic and hydrofluoric acids. The aluminum should be thoroughly rinsed after each precleaning deoxidizing operation prior to treatment in the conversion coating solution.

The clean aluminum surfaces may be treated by dipping the objects into the processing solution. Operating temperature ranges of about 75° to 95° F. and immersion times of ½ to 5 minutes, and preferably of 2 to 3 minutes are recommended. These conditions should be regulated according to the nature of the coating being produced. Thin, bright, uniform coatings are best for corrosion resistance and paint adhesion. If the coating is dull, powdery or chalky, then the temperature or contact time, or both, should be diminished. After its removal from the conversion coating bath, the object is rinsed in water. The final step is the dry-off, which may be accomplished by the usual methods, e.g., treatment of the coated objects in a dry-off oven.

The same baths prepared as above may be used for spraying, with the same kind of surface preparation of the aluminum object. For spraying, the solution temperature should be about 90° to 100° F., and the time of spray contact should be about 1 to 3 minutes. The same bath may also be used for brushing and swabbing applications.

As a means of routine control, a sample of the bath is withdrawn from time to time during operation and for example, the hexavalent chromium content ascertained, expressed as grams per liter of Cr(VI), by usual methods of analysis. It will be found that the Cr(VI) content diminishes as the operation proceeds on a long succession of work pieces, and this periodical determination of Cr(VI) content serves as a convenient criterion as to need for replenishiment of the bath. We have found that the various substances in the processing baths used in practice of this invention are ordinarily consumed in about equal proportions. Therefore, a replenishment that will restore the hexavalent chromium to its original content, serves as a criterion as to the amount of replenishment required for the other constituents of the bath, they being added in the proportions relative to each other employed in constituting the original bath. The depleted Cr(VI) is simply restored and then other materials are added in corresponding amounts to replenish these other components. This procedure is most convenient if the dry chemicals have all been added as one mixed product, since an addition of the mixed product sufficient to restore the depleted Cr(VI) will automatically replenish all other constituents in corresponding degree.

Baths operated in accordance with this invention are free from objectionable deposits of solid sludge on the work, or on bottom of the tanks. The operation proceeds smoothly, with little or no waste of chemicals, throughout application of conversion coatings to a large number of work pieces in succession.

The following examples are presented to illustrate the invention:

Example 1

A dry mixture was produced by intermixing the following materials:

| | Grams |
|---|---|
| $CrO_3$ | 5.0 |
| $Na_2SiF_6$ | 5.9 |
| $NiCO_3$ | 3.0 |
| $NaNO_3$ | 1.0 |

The dry admixture was then made up to a 1 liter aqueous solution. It had a pH of 1.50. The solution had a nickel to nitrate ion ratio of 2:1. Clean aluminum alloy 2024–T3 panels were then immersed in the solution for two minutes at 75° F. The panels were removed, water-rinsed and air-dried. The conversion coating on the panels was uniform golden brown.

The coated panels were placed in a salt spray test cabinet into which a 5% aqueous sodium chloride solution at 97° F. was sprayed to produce a dense fog of the test cabinet according to Federal Test Method Standards 151a, Test Method 6061. The panels were kept in the test cabinet until 5 pinpoint corrosion areas were observed. This condition is accepted as the failure point of the coating. The failure point was reached at 504 hours in the test cabinet.

Example 2

A dry admixture was produced by intermixing the following materials:

| | Grams |
|---|---|
| $CrO_3$ | 5.0 |
| $Na_2SiF_6$ | 7.9 |
| $NiCO_3$ | 1.6 |
| $NaNO_3$ | 0.6 |

This dry admixture was then made up to a 1 liter aqueous solution. It had a pH of 1.51. The solution had a nickel to nitrate ion ratio of 2:1. Clean aluminum alloy 2024–T3 panels were then immersed in the solution for two minutes at 75° F. The panels were removed, water-rinsed and air-dried. The conversion coating on the panels was uniform and golden brown.

The coated panels were placed in a salt spray test cabinet into which a 5% aqueous sodium chloride solution as 97° F. was sprayed to produce a dense fog in the test cabinet according to Federal Test Method Standards 151a, Test Method 6061. The panels were kept in the test cabinet until 5 pinpoint corrosion areas were observed. This condition is accepted as the failure point of the coating. The failure point was reached at 744 hours.

Example 3

A dry admixture was produced by intermixing the following materials:

| | Grams |
|---|---|
| $CrO_3$ | 5.0 |
| $Na_2SiF_6$ | 6.9 |
| $NiCO_3$ | 3.0 |
| $NaNO_3$ | 0.0 |

This dry admixture was then made up to a 1 liter aqueous solution. It had a pH of 1.50. Clean aluminum alloy 2024–T3 panels were then immersed in the solution for two minutes at 75° F. The panels were removed, water-rinsed and air dried. The conversion coating on the panels was yellow-gold.

Using the test method of Example 1, the failure point was reached at 432 hours.

Example 4

A dry admixture was produced by intermixing the following materials:

| | Grams |
|---|---|
| $CrO_3$ | 5.0 |
| $Na_2SiF_6$ | 9.0 |
| $NiCO_3$ | 1.0 |
| $NaNO_3$ | 0.0 |

This dry admixture was then made up to a 1 liter aqueous solution. It had a pH of 1.47. Clean aluminum alloy 2024–T3 panels were then immersed in the solution for two minutes at 75° F. The panels were removed, water-rinsed and air-dried. The conversion coating on the panels was yellow-gold.

Using the test method of Example 1, the failure point was reached at 432 hours.

Example 5

A dry admixture was produced by intermixing the following materials:

| | Grams |
|---|---|
| $CrO_3$ | 5.0 |
| $Na_2SiF_6$ | 10.0 |
| $NiCO_3$ | 0.0 |
| $NaNO_3$ | 0.0 |

This dry admixture was then made up to a 1 liter aqueous solution. It had a pH of 1.52. Clean aluminum alloy 2024–T3 panels were then immersed in the solution for two minutes at 75° F. The panels were removed, water-rinsed and air-dried. The conversion coating on the panels was irridescent yellow.

Using the test method of Example 1, the failure point was reached at 240 hours.

Example 6

A dry admixture was produced by intermixing the following materials:

| | Grams |
|---|---|
| $CrO_3$ | 5.0 |
| $Na_2SiF_6$ | 2.6 |
| $NiCO_3$ | 6.1 |
| $NaNO_3$ | 1.4 |

This dry admixture was then made up to a 1 liter aqueous solution. It had a pH of 1.52. The solution had a nickel to nitrate ion ratio of 3:1. Clean aluminum alloy 2024–T3 panels were then immersed in the solution for two minutes at 75° F. The panels were removed, water-rinsed and air-dried. The conversion coating on the panels was a uniform, irridescent, yellow-brown.

Using the test method of Example 1, the failure point was reached at 504 hours.

Example 7

A dry admixture was produced by intermixing the following materials:

| | Grams |
|---|---|
| $CrO_3$ | 5.0 |
| $Na_2SiF_6$ | 6.3 |
| $NiCO_3$ | 3.0 |
| $NaNO_3$ | 0.6 |

This dry admixture was then made up to a 1 liter aqueous solution. It had a pH of 1.52. The solution had a nickel to nitrate ion ratio of 3:1. Clean aluminum alloy 2024–T3 panels were then immersed in the solution for two minutes at 75° F. The panels were removed, water-rinsed and air-dried. The conversion coating on the panels was a uniform, irridescent, golden brown.

Using the test method of Example 1, the failure point was reached at 910 hours.

Example 8

A dry admixture was produced by intermixing the following materials:

| | Grams |
|---|---|
| $CrO_3$ | 5.0 |
| $Na_2SiF_6$ | 6.5 |
| $NiCO_3$ | 2.75 |
| $Ni(NO_3)_2 \cdot 6H_2O$ | 0.71 |

This dry mixture was then made up to a 1 liter aqueous solution. It had a pH of 1.52. The solution had a nickel to nitrate ion ratio of 5:1. Clean aluminum alloy 2024–T3 panels were then immersed in the solution for two minutes at 75° F. The panels were removed, water-rinsed and air-dried. The conversion coating on the panels was a uniform yellow-gold.

Using the test method of Example 1, the failure point was reached at 528 hours.

Example 9

A dry admixture was produced by intermixing the following materials:

| | Grams |
|---|---|
| $CrO_3$ | 5.0 |
| $Na_2SiF_6$ | 4.0 |
| $NiCO_3$ | 3.0 |
| $NaNO_3$ | 3.0 |

This dry admixture was then made up to a 1 liter aqueous solution. It had a pH of 1.62. The solution had a nickel to nitrate ion ratio of 1:1. Clean aluminum alloy 2024–T3 panels were then immersed in the solution for two minutes at 75° F. The panels were removed, water-rinsed and air-dried. The conversion coating on the panels was a non-uniform yellow.

Using the test method of Example 1, the failure point was reached at 267 hours.

Example 10

A dry mixture was produced by intermixing the following materials:

| | Grams |
|---|---|
| $CrO_3$ | 5.0 |
| $Na_2SiF_6$ | 2.0 |
| $NiCO_3$ | 6.0 |
| $NaNO_3$ | 3.0 |

This dry admixture was then made up to a 1 liter aqueous solution. It had a pH of 1.58. The solution had a nickel to nitrate ion ratio of 1:2. Clean aluminum alloy 2024–T3 panels were then immersed in the solution for two minutes at 75° F. The panels were removed, water-rinsed and air-dried. The conversion coating on the panels was a non-uniform yellow.

Using the test method of Example 1, the failure point was reached at 160 hours.

Various changes and modifications of the invention can be made and, to the extent that such variations incorporate the spirit of this invention, they are intended to be included within the scope of the appended claims.

What is claimed is:

1. A solid free-flowing dry composition of matter for the preparation of aqueous baths for coating objects of aluminum and its alloys, in the form of a mixture of compounds comprising a compound which releases nickel cations in water, the composition containing about 3% to 35% by weight of nickel, a compound supplying hexavalent chromium-containing anions in water, the composition containing about 5% to 50% by weight of hexavalent chromium, a compound supplying nitrate anions in water, the composition containing about 0.6% to about 17.5% by weight of nitrate, and a halogen compound which releases halogen-containing anions in water, the composition containing about 2% to 40% by weight of halogen calculated as simple halogen, and said composition containing said nickel and nitrate ions in a ratio of about 2.5 to 4.5 parts nickel to 1 part nitrate.

2. A dry mixture of the following materials:

| Ingredients: | Percent by wt. |
|---|---|
| Sodium silicofluoride, $Na_2SiF_6$ | 48.0 |
| Chromium trioxide, $CrO_3$ | 35.6 |
| Nickel carbonate, $NiCO_3$ | 11.2 |
| Nickel nitrate, $Ni(NO_3)_2 \cdot 6H_2O$ | 5.2 | in which the ratio of $Ni^{++}$ to $(NO_3)^-$, when added to water is 3:1.

3. A process of applying a golden colored conversion coating to surfaces of objects of aluminum and its alloys, which comprises treating said objects with an acidic aqueous bath at a pH of 1.3 to 1.7 containing fluorine anions, hexavalent chromium-containing anions, nickel cations and nitrate anions with the ratio by weight of nickel to nitrate being from about 2.5 to 4.5 parts nickel to 1 part nitrate and each liter of the bath contains 0.2 to 8 g. of nickel and 0.3 to 9 g. of chromium, and with 1 part by weight of said fluorine anions being present to about 0.7 to 2.5 parts of chromium.

References Cited

UNITED STATES PATENTS

| 2,976,193 | 3/1961 | Pimbley | 148—6.27 XR |
| 3,066,055 | 11/1962 | Pimbley | 148—6.27 |

JULIUS FROME, *Primary Examiner.*

L. HAYES, *Assistant Examiner.*

U.S. Cl. X.R.

106—14; 117—127; 148—6.27